H. V. SMITH.
TURBINE.
APPLICATION FILED MAR. 28, 1912.

1,031,093.

Patented July 2, 1912.
2 SHEETS—SHEET 1.

WITNESSES:
H.W. Meade
S.W. Atkerton

INVENTOR
Henry V. Smith
BY
A. M. Wooster
ATTORNEY

H. V. SMITH.
TURBINE.
APPLICATION FILED MAR. 28, 1912.
1,031,093.
Patented July 2, 1912.
2 SHEETS—SHEET 2.
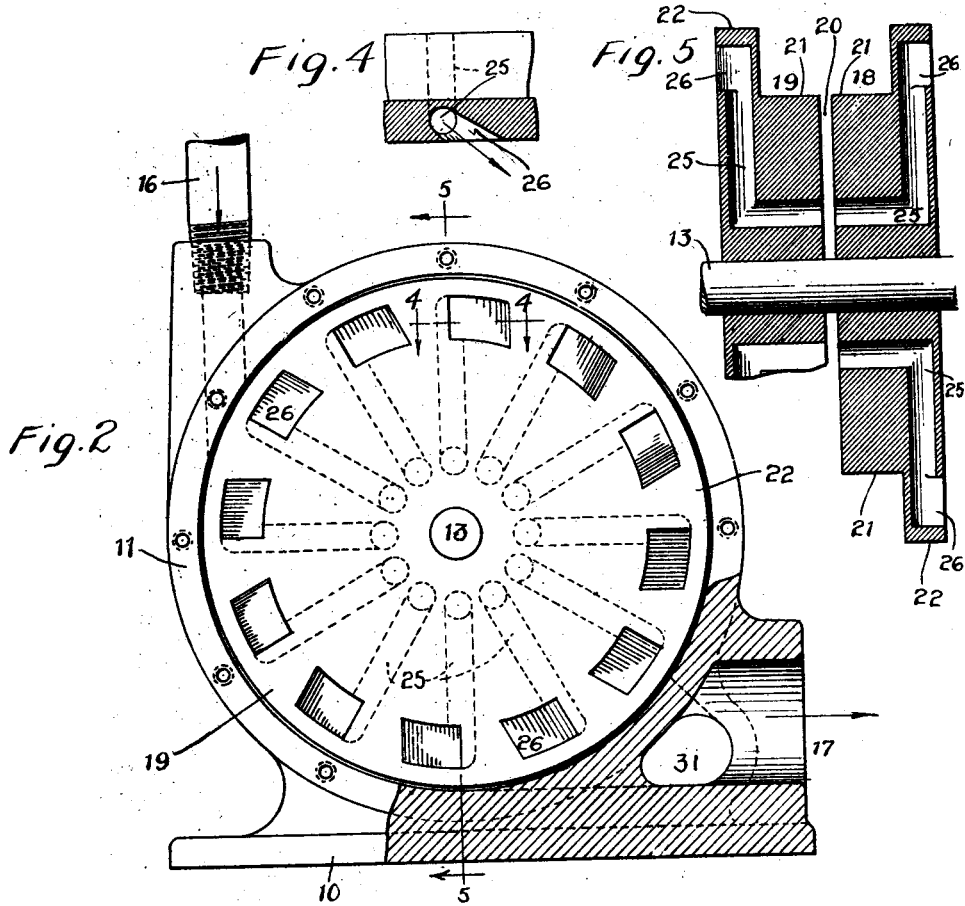
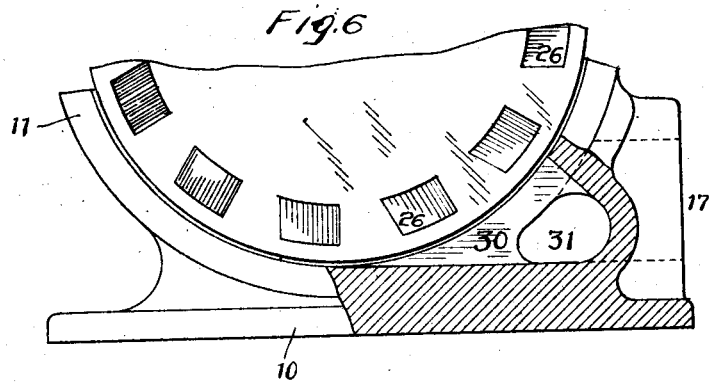
WITNESSES:
H. W. Meads.
S. W. Atherton.
INVENTOR
Henry V. Smith
BY
H. M. Wooster
ATTORNEY

UNITED STATES PATENT OFFICE.

HENRY V. SMITH, OF BRIDGEPORT, CONNECTICUT, ASSIGNOR OF ONE-FOURTH TO EUGENE H. H. SMITH, OF BRIDGEPORT, CONNECTICUT.

TURBINE.

1,031,093.  Specification of Letters Patent.  Patented July 2, 1912.

Application filed March 28, 1912. Serial No. 686,905.

*To all whom it may concern:*

Be it known that I, HENRY V. SMITH, a citizen of the United States, residing at Bridgeport, county of Fairfield, State of Connecticut, have invented an Improvement in Turbines, of which the following is a specification.

This invention relates to turbine engines adapted for general use and with any operating fluid as for example, steam, gas or water, and the invention has for its objects to simplify and cheapen the construction and to greatly increase the efficiency of the engine.

With these and other objects in view, the invention consists in certain constructions and in certain parts, improvements and combinations which will be hereinafter described and then particularly pointed out in the claims hereunto appended.

Figure 1:
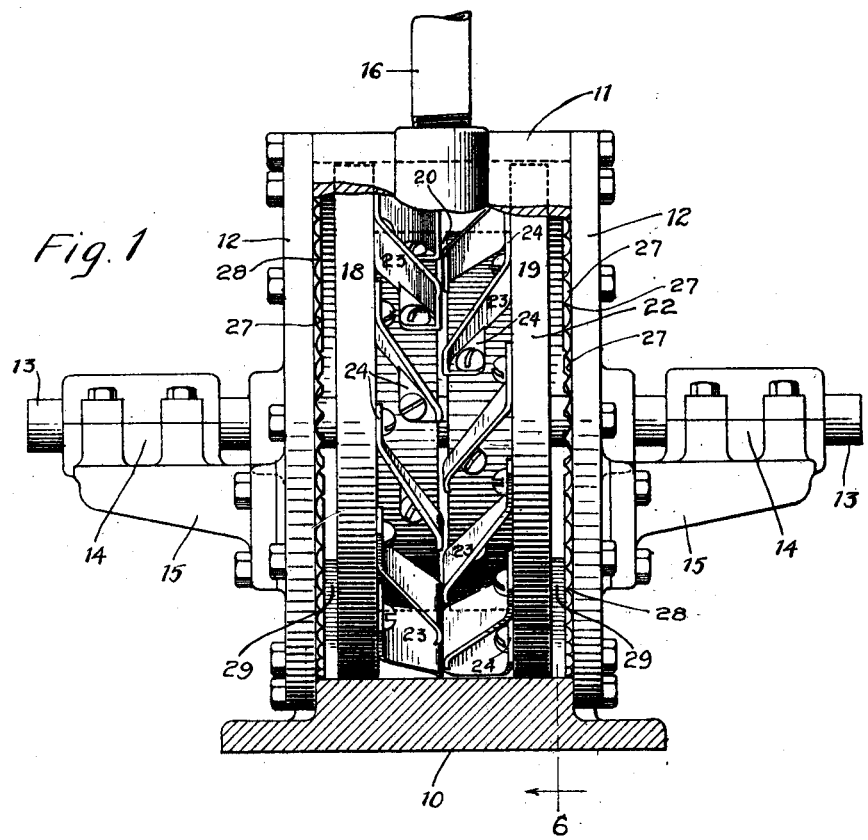
Figure 3:
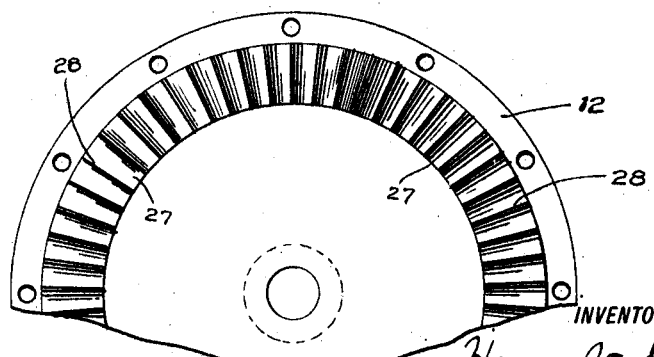

In the accompanying drawings forming a part of this specification, Figure 1 is an elevation with the case broken away to show the construction of the rotors; Fig. 2, an elevation as seen from the right in Fig. 1, the end plate being removed; Fig. 3, an inner face view of one of the end plates removed; Fig. 4, a detail sectional view on the line 4—4 in Fig. 2, looking in the direction of the arrows; Fig. 5, a section on the line 5—5 in Fig. 2, looking in the direction of the arrows; and Fig. 6 is a section on the line indicated by 6 in Fig. 1, looking in the direction of the arrow.

10 denotes the base, 11 the casing, 12 the end plates, and 13 the shaft shown as journaled in bearings 14 upon brackets 15 secured to or made part of the end plates. Steam is supplied centrally of the casing by means of a pipe 16 and is exhausted centrally as at 17.

18 and 19 denote the rotors which are rigidly secured to the shaft but are separated from each other leaving a space 20 between them. Each rotor comprises a hub 21 and a flange 22.

23 denote blades provided with flanges 24 by means of which they are rigidly secured to the inner sides of the flanges and to the peripheries of the hubs as clearly shown in Fig. 1. The blades are placed alternately, that is in staggered relation and at an effective angle to the planes of the flanges, for example at an angle of thirty degrees more or less, so that the steam as it passes from a blade upon one rotor will impinge against a blade upon the other rotor. It is obvious that space 20 will become at once filled with the operating fluid, which for convenience we will consider to be steam. From this space the steam passes through ports 25 in the hubs and flanges of the rotors, (see Fig. 5), which terminate in inclined openings 26 in the outer faces of the flanges (see Fig. 4). The direction of these openings is such as to cause the steam to impinge against the inner faces of the end plates, which are provided with alternate depressions 27 and raised portions 28. The special shape of these depressions and raised portions is not of the essence of the invention. They are, however, so constructed as to catch the steam as it issues from openings 26 and utilize the whole force of the reaction in driving the rotors forward.

29 denotes spaces between the rotors and the end plates. Steam passes from these spaces through passages 30 at the ends of the casing into a transverse passage 31 and thence out through the exhaust which is placed centrally of passage 31. It will be noted that there is a primary and a secondary action of the steam on the rotors. First, its action on the blades, passing from the blades of one rotor across the central space and impinging against the blades of the other rotor, and second, its reaction upon the rotors as it issues from the inclined openings of the ports and impinges against the raised and depressed portions of the end plates.

Having thus described my invention I claim:

1. A turbine comprising a shaft, rotors secured thereto leaving a central space between them and provided with ports leading from said space to their outer faces, and blades upon the inner faces of the rotors in staggered relation.

2. A turbine comprising a shaft, rotors secured thereto leaving a central space between them and provided with ports leading from said space to their outer faces, and having inclined openings, blades upon the inner faces of the rotors in staggered relation and end plates having alternate depressions and raised portions against which the steam impinges as it passes from the ports.

3. A turbine comprising a casing having means for taking steam, a transverse passage, passages leading thereto and an exhaust leading therefrom, end plates having alternate raised portions and depressions, rotors having a central space between them and end spaces between the rotors and the end plates, said rotors being provided with ports leading from the central space and opening into the end spaces and blades upon the inner faces of the rotors in staggered relation, fluid passing from each rotor blade to a blade upon the other rotor and from the central space through the ports and against the end plates and thence out through the passages and exhaust.

4. In a turbine, the combination with a casing provided with means for taking and exhausting fluid, of rotors having a central space between them, blades on their inner faces in staggered relation and ports leading from the central space and opening in their outer faces.

5. In a turbine, the combination with a casing provided with means for taking and exhausting fluid, of rotors having a central space between them and comprising hubs and flanges, blades secured to the hubs and flanges in staggered relation, and ports leading from the central space through the hubs and opening in the outer faces of the flanges.

6. In a turbine, the combination with a casing provided with means for taking and exhausting fluid, and having end plates provided on their inner faces with raised and depressed portions, of rotors having blades on their inner faces in staggered relation and having a space between them, said rotors being provided with ports leading from the central space and having inclined openings on the outer faces of the rotors contiguous to the raised and depressed portions of the end plates.

7. In a turbine, the combination with rotors having a central space between them, blades on their inner faces in staggered relation and ports leading from the central space to their outer faces, of end plates having raised and depressed portions contiguous to the openings of the ports, substantially as described, for the purpose specified.

8. A turbine rotor comprising a hub and flange, blades secured to the periphery of the hub and the inner face of the flange and ports leading from the inner face of the hub and opening in the outer face of the flange.

9. A turbine rotor having inclined blades on its periphery and ports leading from its inner face near the center and opening in its outer face near the periphery.

In testimony whereof I affix my signature in presence of two witnesses.

HENRY V. SMITH.

Witnesses:
J. H. HINCKLEY,
W. H. BULLARD.